Jan. 7, 1964

R. DONGUY ETAL 3,116,757

ROTARY SELECTOR PERMITTING VARIABLE COMMUNICATIONS
TO BE ESTABLISHED BETWEEN AN ASSEMBLY
OF PASSAGEWAYS TRAVERSED BY A FLUID

Filed June 1, 1960

INVENTOR

BY

ATTORNEY

Jan. 7, 1964  R. DONGUY ETAL  3,116,757
ROTARY SELECTOR PERMITTING VARIABLE COMMUNICATIONS
TO BE ESTABLISHED BETWEEN AN ASSEMBLY
OF PASSAGEWAYS TRAVERSED BY A FLUID
Filed June 1, 1960  6 Sheets-Sheet 2

INVENTOR

BY

ATTORNEY

Jan. 7, 1964    R. DONGUY ET AL    3,116,757
ROTARY SELECTOR PERMITTING VARIABLE COMMUNICATIONS
TO BE ESTABLISHED BETWEEN AN ASSEMBLY
OF PASSAGEWAYS TRAVERSED BY A FLUID
Filed June 1, 1960    6 Sheets-Sheet 3

INVENTOR

BY

ATTORNEY

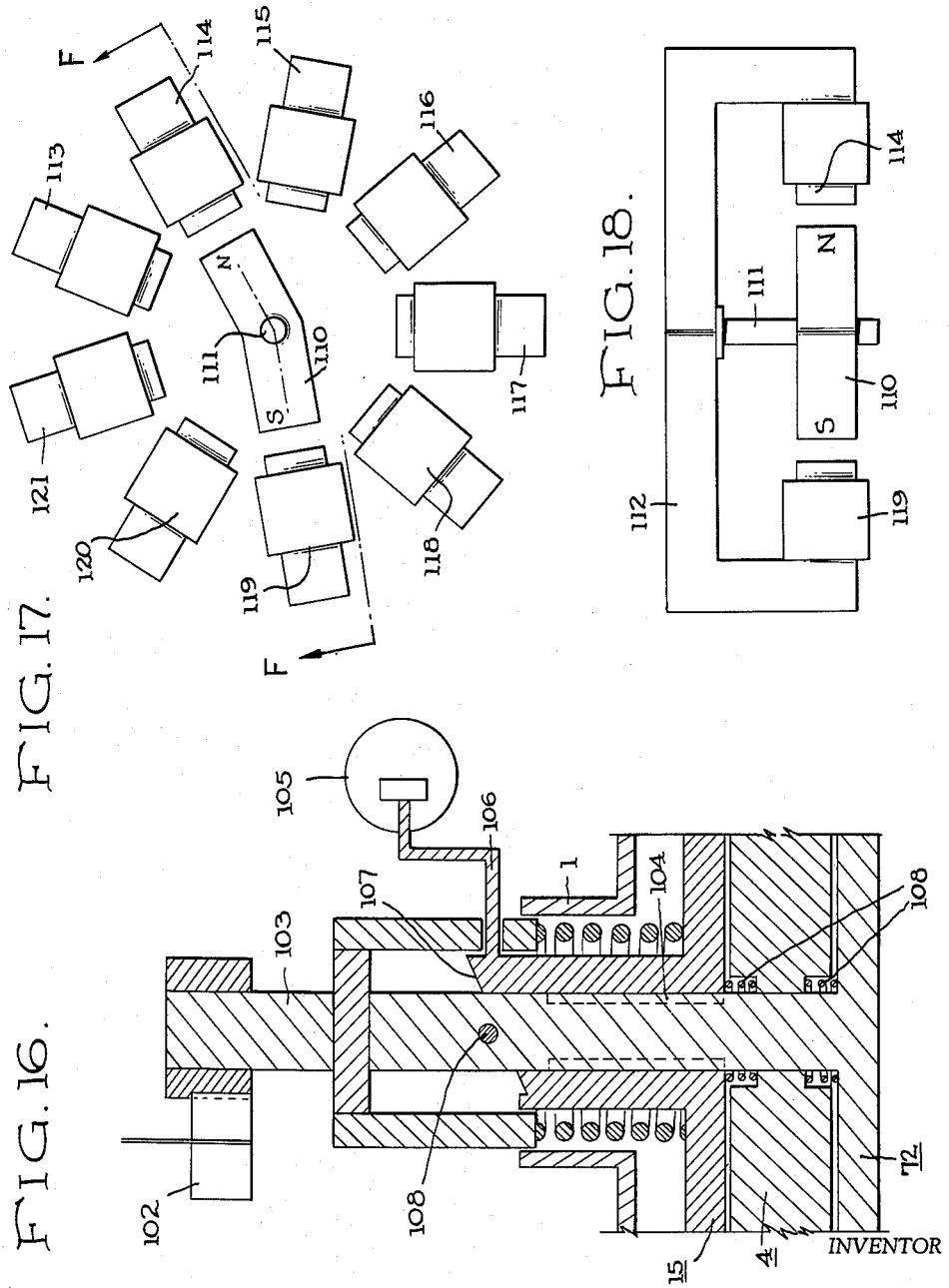

United States Patent Office 3,116,757
Patented Jan. 7, 1964

3,116,757
ROTARY SELECTOR PERMITTING VARIABLE COMMUNICATIONS TO BE ESTABLISHED BETWEEN AN ASSEMBLY OF PASSAGEWAYS TRAVERSED BY A FLUID
René Donguy, Vanves, André Reguin, Antony, and Jean Megy, Bourg-La-Reine, France, assignors to Commissariat à l'Energie Atomique, Paris, France
Filed June 1, 1960, Ser. No. 33,337
Claims priority, application France June 4, 1959
6 Claims. (Cl. 137—625.11)

The present invention relates to a rotary selector permitting variable communications to be established between an assembly of passageways traversed by a fluid.

Passageway selector devices are used for provision of installations for the rupture of casings associated with nuclear reactors, in which a coolant fluid circulates in contact with encased elements of fuel.

In such installations, the fluid issuing from the reactor channels is recovered in branch lines or tappings, namely channel tappings; these tappings represent passageways for the inlet of fluid to the selector; the outlet passageways are connected to detector apparatus.

These installations permit it to be determined which channel is being traversed by a fluid charged with radioactive products escaping from the core of the fuel elements during fission of their casing.

There has also been used, in place of common selectors having a certain number of channels, a single control system for each channel, namely one valve per channel; but the cumbersomeness and cost of installation are very high.

The selector according to the invention is characterised in that it comprises, at the interior of a mono-block sealed casing, a fixed circular base at the periphery of which at most several dozen holes are distributed where the fluid inlet conduits discharge, one or more rotary plates contacting the base, the plates being on the one hand pierced with holes connecting the surface or surfaces of contact between the base and the plates with the interior of the casing and one or two outlet passageways traversing the latter and, on the other hand, provided with blockage members, of sliding carbon for example, interspersed between the holes and intended to be adapted to the holes in the base for closing the latter at the level of the corresponding plate, the blockage members either being mounted elastically in the plates when they rest permanently in contact with the base or being fixed and projecting with respect to the contact surface (closure bosses), a control device for step-by-step rotation of the plates and, in the case of projecting blockage members, a device for spacing the plates from the base, the devices being incorporated in the interior of the casing and being actuated pneumatically or electrically in such a manner that, on the one hand, rotations corresponding to the angular spacing of two holes in the base permit each inlet passageway to be successively communicated with a given outlet passageway, one of the positions corresponding to cessation of communication between this passageway and the inlet passageways and in that, on the other hand, rotations through an angle identical to the aforesaid rotations but effected from a starting position spaced with respect to the preceding positions permit successive communication either between all the inlet passageways less one and one of the outlet passageways and between the last inlet passageway and another outlet passageway or between all the inlet passageways less one and a single outlet passageway, one of the positions corresponding to communication between all the inlet passageways and the outlet passageway.

The selector according to the invention can be used efficiently for providing installations for the detection of rupture of a casing and the number of inlet passageways has been particularly determined for this purpose. It can also be used whenever it is proposed to establish variable communications between a certain number of inlet passageways and one or more outlet passageways, which renders it particularly useful whenever it is proposed to inspect some of these passageways, for example to test, in the case of a mixture of gaseous products in different units of manufacture and which should respond to certain standards of composition, for the passageway which exhibits an accidental variation in chemical composition and, also, to study more particularly one amongst them.

In a particular embodiment of the invention, it is arranged that the angular displacement between the two series of characteristic rotations be equal to half the angle of these rotations, which corresponds to an angular displacement between two consecutive holes in the base. Let $n$ be the number of holes in the base. The angular displacement between two consecutive holes is $$\frac{2\pi}{n+1}$$

except for two holes for which the spacing is double. On the plate, there are $(n+1)$ holes; the spacing of $n$ of these holes is $$\frac{2\pi}{n+1}$$

the $(n+1)e$ of these holes is situated, on the one hand, at $$\frac{2\pi}{2(n+1)}$$

from one of the $n$ holes aforesaid and, on the other hand, at $$\frac{3}{2} \times \frac{2\pi}{(n+1)}$$

from another of these $n$ holes; the blockage members are interspersed at the midpoints between the holes in the plate spaced by $$\frac{2\pi}{n+1}$$

which gives $(n+1)$ members; two other blockage members making between them an angle of $$\frac{2\pi}{2(n+1)}$$

are each disposed at $$\frac{2\pi}{2(n+1)}$$

from the two holes spaced by $$\frac{3\pi}{2(n+1)}$$

It is arranged preferably that, on the one hand, when the sense of rotation of the plate is reversed, a rotation of $$\frac{2\pi}{2(n+1)}$$

results and that, on the other hand, when several rotations follow in the same sense, there is each time a rotation of $$\frac{2\pi}{n+1}$$

which permits as desired to pass from one of the series of rotations such as those defined above to the other series; $n$ can be chosen to be of the order of 10 for example.

According to one feature of the invention, sealing between the plate or plates and the base is ensured without any lubrication and up to temperatures of the order of 350° C.; thus, the fluid conveyed is not contaminated and operation does not necessitate any maintenance; on stopping, the blockage members, having a diameter greater than that of the holes, are applied to the base by reason of their mounting on an elastic support, on the face of the holes thereof or in the intervals between the holes; the base and plates are of stainless steel; during rotation, two cases can be produced; in the first case, the plate or plates rotating in contact with the base and the blockage members, of sliding carbon for example, permit rotation with rubbing in the dry state; the sealing and the rubbing are correct without lubrication; the operating couple is constant (if the differential pressures are constant) but is not negligible; in the second case, the plate or plates are slightly spaced on the base during rotation; rotations with rubbing of non-lubricated materials are eliminated and the operating couple is thus low.

The advantages of the selector according to the invention are the following:

(i) Less cumbersomeness with respect to unitary valve systems;

(ii) Time of dismantling and re-assembling low compared with selectors having a large number of passageways;

(iii) Operation without lubrication up to temperatures of 350° C.;

(iv) Total sealing with regard to the exterior, all the elements being assembled by welding;

(v) Elements of inoxidisable materials (for example, stellitic stainless steels or nitrided stainless steels where the fluid is carbon dioxide gas at 350° C.);

(vi) Losses of charge reduced to a minimum, because the sections of the passage are preserved (the diameters of the inlet passageways, the holes in the base and the holes of the plate or plates correspond);

(vii) Possibility of adapting to a signalling system for indicating the sense of passage of the fluid;

(viii) Possibility of reducing by a maximum the function couple by disconnecting the plate or plates from the base;

(ix) Intercommunications between the different inlet passageways are reduced to a minimum during rotations;

(x) Possibility of passing from one of the series of rotations to the other and, in consequence, effect of establishing as desired all the communications described above between the inlet passageways and the outlet passageway or passageways, by simple inversion of the sense of rotation of the means controlling the rotation;

(xi) Except in some starting positions, impossibility of creating local countercurrents following sealed closure of the inlet passageways, which countercurrents can be created if this condition has not been effected by the differences in pressure which can exist between the different inlet passageways.

Referring to the accompanying diagrammatic FIGS. 1—18, there are described below several embodiments, given by way of example only, of the operation of a rotary selector permitting variable communications to be effected between an assembly of passageways or conduits traversed by a fluid.

These figures relate to selectors for the provision of installations for the detection of rupture of a casing for fuel elements in atomic reactors; the inlet passageways communicate with the fuel channels and the outlet passageways with the detection device; in operation of these selectors, there can be distinguished a cycle of general inspection, a cycle of individual inspection and a follower cycle; in general inspection, it is to be understood that the fluid issuing from the majority of the channels or all of the channels served by the selector passes, after traversing the latter, to the same outlet passageway which is called the "inspection passageway"; in individual inspection, it is to be understood that, as an anomaly has been reported in the assembly of the channels inspected in the block, each inlet passageway, i.e. each inlet channel, is successively communicated with the single outlet channel ("inspection passageway") or with the other outlet passageway (therefore referred to as the "follower passageway"); when the anomaly has been localised, communication is established for the desired duration between the canal in question and the single outlet passageway ("inspection passageway") or, in the case of two outlet passageways, between the channel in question and the "follower passageway."

The selectors described in these embodiments are provided with eight inlet passageways and one or two outlet passageways.

FIG. 16 shows the device for simultaneously spacing the plates and the base;

FIG. 17 shows a view from above of an electromagnetic device for control by step-by-step rotation particularly applicable to the selector of FIGS. 12—16;

FIG. 18 shows a section on the line F—F of FIG. 17.

Figure 1:
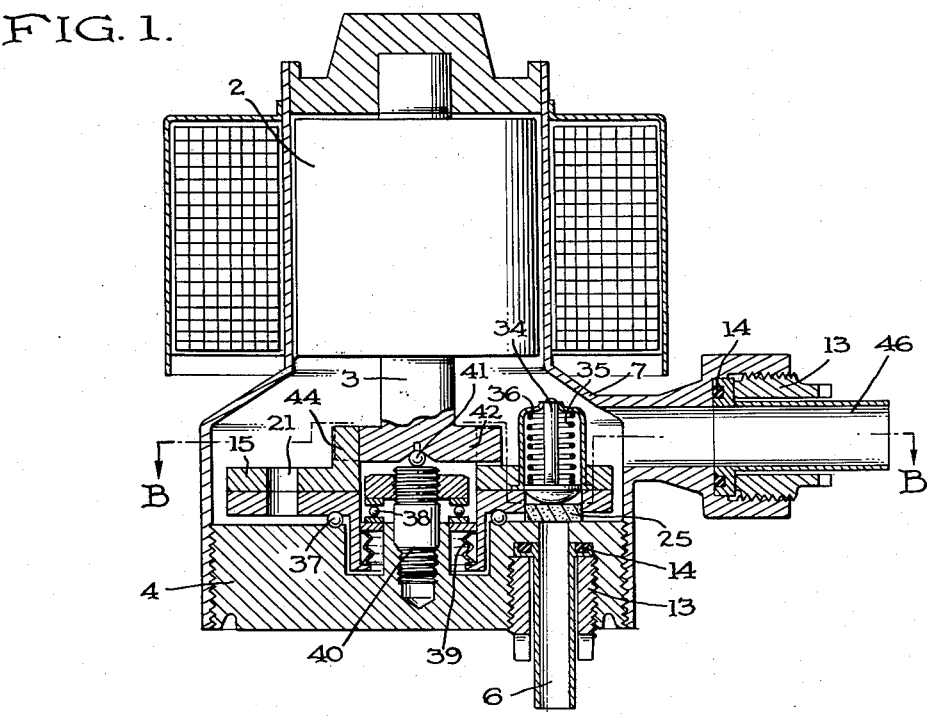
FIG. 1 shows a section in the plane A—A of FIG. 2 through a selector according to the invention comprising a single rotary plate and a single outlet passageway.

FIG. 1 shows the casing 1 of the selector; the control device 2 is disposed on the upper part of this casing and rotates a shaft 3 step-by-step; the base 4 is welded to the lower part of the casing 1, all the constituent parts of which are welded in a general manner; the eight inlet passageways 5, 6, 7, 8, 9, 10, 11 and 12 are connected to the base 4 through the intermediary of threaded unions 13, sealing being obtained by a toroidal joint 14; it is also possible to connect the inlet tubes with the base 4 by welding.

The rotary plate 15 comprises nine passageway orifices 16, 17, 18, 19, 20, 21, 22, 23 and 24 and nine blockage members 25, 26, 27, 28, 29, 30, 31, 32 and 33 of special carbon for dry lubrication. These blockage members are applied, through the intermediary of a piston 34 and a spring 35, to the plane of sliding of the base of stellitic stainless steel, the spring 35 abutting a cage 36 connected to the plate 15. An assembly of two ball bearings 37 and 38 applied by a spring 39 permits correctly centred rotation on a threaded shaft 40 forming an axle. The shaft 3 centered by a ball 41 on the axle 40 rotates the plate 15.

Figure 2:
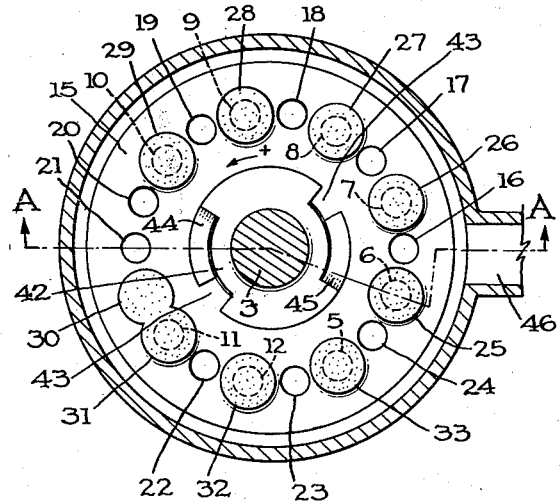
FIG. 2 is a section on the line B—B of FIG. 1.
Figure 3:
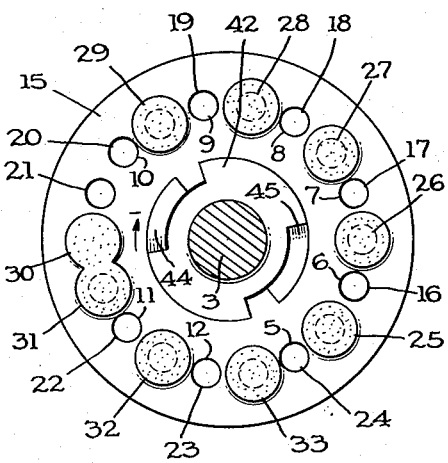
FIGS. 3 and 4 are sections also along the line B—B of FIG. 1 but more diagrammatically and show two other characteristic positions for the plate.
Figure 4:
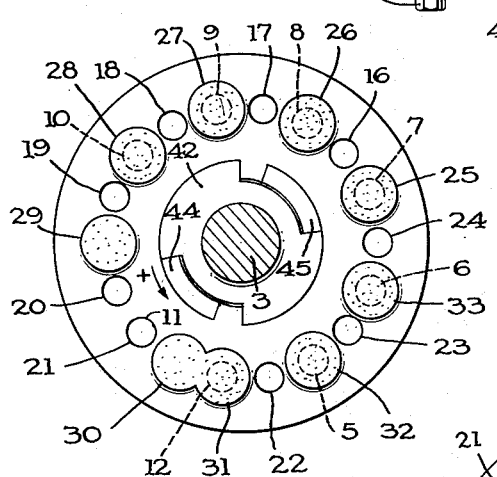

The connecting means between the plate 15 and the shaft 3 are shown particularly in FIG. 2, where 42 represents the terminal part of the shaft; this part has the form of a disc including two peripheral gaps 43 such that the radial faces of the disc 42 drive the plate 15 rotationally, by exerting a couple of the radial faces of the abutments 44 and 45 connected to the plate, in such a manner that, at each reversal of the sense of rotation, there is a dead space or lost motion equivalent to 20°, the angle of rotation of the disc 42 in one sense or the other always being 40°; the latter angle is equal to that of two consecutive orifices, both in the plate 15 and in the base 4 or to that of two consecutive blockage members, except for the members 29, 30, 31, the orifices 20, 21 and 22 in the plate 15 and the orifices 10 and 11 in the base 4, the positions are shown in FIGS. 2–4. A single outlet passageway 46 is mounted laterally on the casing 1 of the apparatus in the same manner as the inlet passageways.

FIG. 2 corresponds to the position of closure of all the inlet passageways, the blockage members being applied so as to cover the eight orifices 5 to 12 of the base member 4; this position has been obtained, in accordance with the position of the abutments 44 and 45 with respect to the disc 42, such as shown in FIG. 2, by rotation in the sense of the arrow (positive sense for an observer situated above the plane B—B of FIG. 1).

If the sense of rotation is reversed and an angle of (−40°) for the axis 3 is described, there results a rotation of (−20°) of the plate 15 and at each of the eight holes in the base 4 there is correspondingly a hole in the plate 15; this is the position shown in FIG. 3; all the inlet passageways discharge through the intermediary of the common chamber situated above the plate 15 into the single outlet passageway 46.

A rotation of (+40°) of the axle 3 starting from total closure (FIG. 2), that is to say a rotation of (+40°) of the rotary plate 3, effects single transfer from the passageway 11 to the outlet passageway 46, the orifice 21 of the plate then facing this passageway; this is the position shown in FIG. 4; if a new rotation of (+40°) of the axle 3 is then effected, there is obtained a rotation of (+40°) of the plate 15 and a communication is established between the passageway 12 and the outlet passageway 46.

It may be noted that between two successive positions of individual inspection (one inlet passageway open), by inversion of the sense of rotation, a rotation of (−20°) of the plate 15 can be effected, which corresponds to opening of the seven other inlet passageways, except at the start of the cycle where there is opening of all the inlet passageways (general inspection).

Prolonged arrest at one of the positions of individual inspection permits observation of the corresponding channel, thereby effecting the "follower function" which completes the functions of general and individual inspection.

Figure 5:
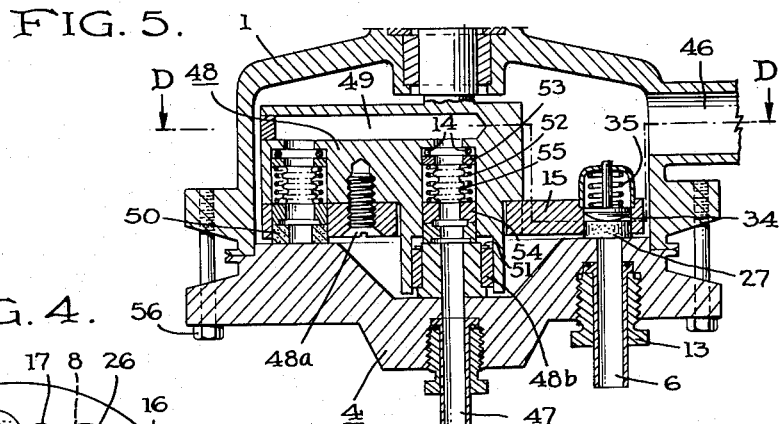
FIG. 5 shows an axial section through a second selector according to the invention comprising a single plate and two outlet passageways, the plane corresponding to the line C—C of FIG. 6.

The selector shown in FIG. 5 comprises substantially the same parts as the selector above; in addition to the outlet passageway 46 ("inspection passageway"), a second outlet passageway 47 ("follower passageway") is provided which is disposed on the axis of the base 4; the internal diameter of the inlet passageways and the "follower passageway" is 10 mm., that of the "inspection passageway" is 25 mm.; a part 48 connected to the plate 15 is disposed radially on the latter in its upper part; in its median part, it traverses the plate 15 into which it is screwed; the screw connection is ensured by the screw thread 48a; the lower portion of the part 48 permits centering of the assembly of the plate 15 and the part 48, due to a pin 48b; the part 48 is traversed interiorly with a channel 49 which permits communication between the annular peripheral zone of the plane of sliding of the base 4 and the plate 15 and the "follower passageway" 47; sealing at these two levels is ensured by two rings 50 and 51 of special carbon for dry friction; these are mounted elastically through the intermediary of springs 52 abutting metallic rings 53 and 54; the rings 50 and 51 are inserted and soldered (by means of an electrolytic deposit of silver) in the rings 53 and 54; sealing between the channel 49 and the space situated between the base 4 and the plate 15 is ensured by expansible chambers 55; a system (not shown in FIG. 5) identical with that of the selector described with reference to FIGS. 1, 2, 3 and 4, permits successive rotations of the plate 15 and the part 58 through 40° in the same sense, this rotation only being 20° when the sense of rotation is reversed; the system of suspension of the plate 15 has been displaced to the level of the axle 3, immediately below the system of control of rotation located at the upper part of the selector; a screw assembly 56 permits connection of the base 4 to the casing 1, sealing being effected by soldering the flanges of these members.

Figure 6:
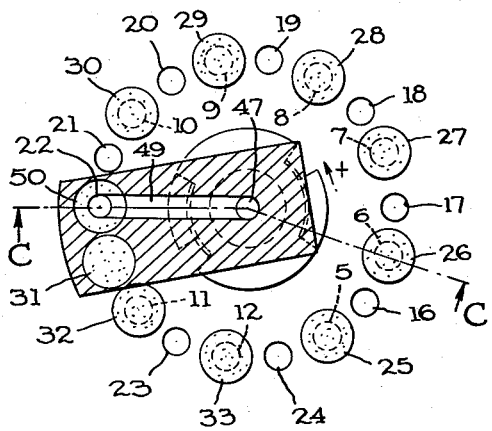
FIG. 6 is a section on the line D—D of FIG. 5.

In addition to the rings 50 and 51, the plate 50/part 48 system includes nine blockage members 25, 26, 27, 28, 29, 30, 31, 32 and 33 and nine orifices 16, 17, 18, 19, 20, 21, 22, 23 and 24, the orifice 22 being that which is delimited by the ring 50 and which can communicate the plane of sliding of the base 4 on the plate 15 with the "follower passageway" 47; the blockage members and orifices are disposed as indicated in FIG. 6; in the position shown in this figure, the eight inlet passageways 5, 6, 7, 8, 9, 10, 11 and 12 are closed.

Figure 7:
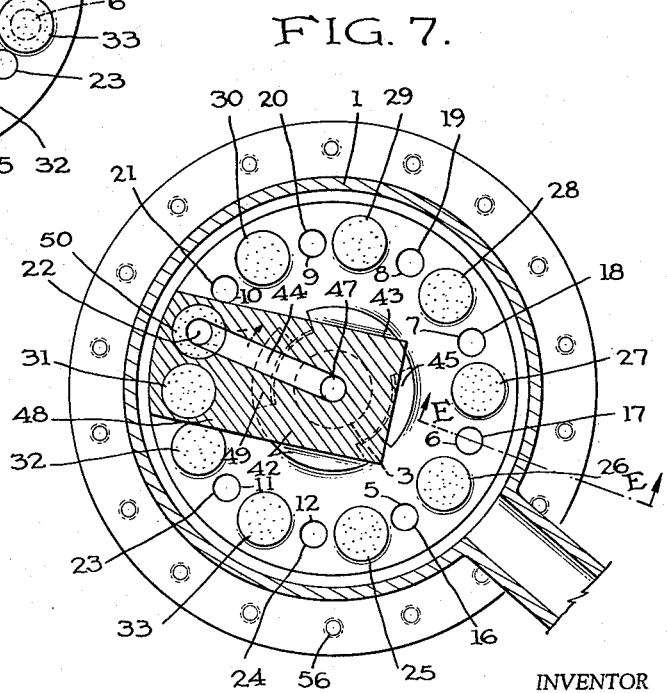
FIGS. 7, 8 and 9 are sections also along D—D of FIG. 5 but more diagrammatically and showing three other characteristic positions of the plate.

If starting from the position shown in this figure a rotation of (−40°) occurs, thereby being transformed by the lost motion device of the disc 42 into a rotation of (−20°), the position shown in FIG. 7 is then obtained; all the inlet passageways are connected to the "inspection passageway" 46; a new reversal of the sense of rotation permits return to the "fully closed" position.

Figure 8:
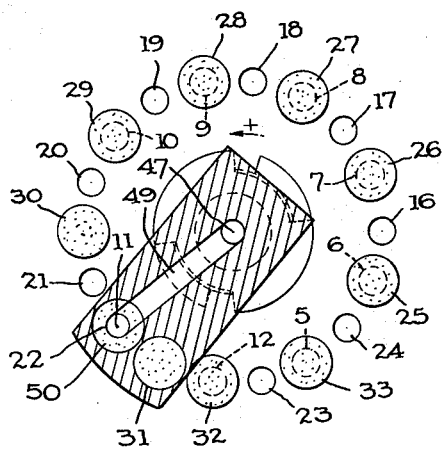
Figure 10:
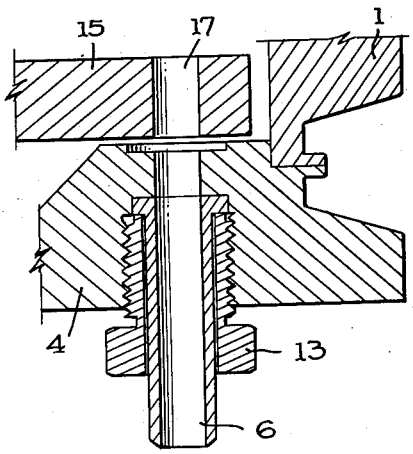
FIG. 10 shows a section along E—E of FIG. 7.

If starting from the position shown in FIG. 6 ("fully closed" position), a rotation of (+40°) is effected, the plate 15 then turns through (+40°); the position shown in FIG. 8 is then obtained; communication is then established between the inlet passageway 11 and the "follower passageway" 47 (through the intermediary of the channel 49), while the seven other inlet passageways are closed; new rotations of (+40°) from the position shown in FIG. 8 permit successive communication of each of the inlet passageways with the "follower passageway" 47, while the seven other inlet passageways are closed (individual inspection function and follower function); the fundamental difference with the selector described in FIGS. 1–4 consists in that the fluid in each of the channels can be passed through a special passageway independently of the "inspection passageway."

Figure 9:
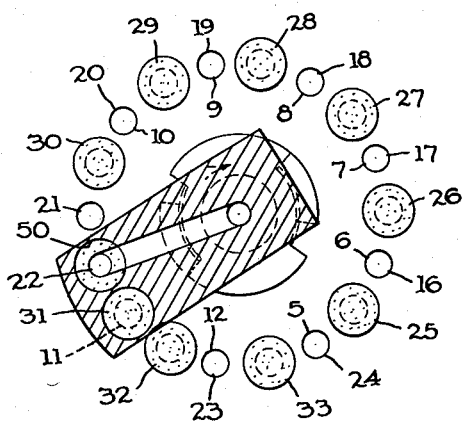

Between two successive positions of individual inspection, it is possible to pass, by inversion of the sense of rotation, to communication between seven of the inlet passageways and the "inspection passageway" (except at the start of the cycle where all of the inlet passageways are in connection with the "inspection passageway"); this case is that in FIG. 9 where the passageway 11 is closed, while the seven other passageways are connected to the "inspection passageway" 46.

Figure 11:
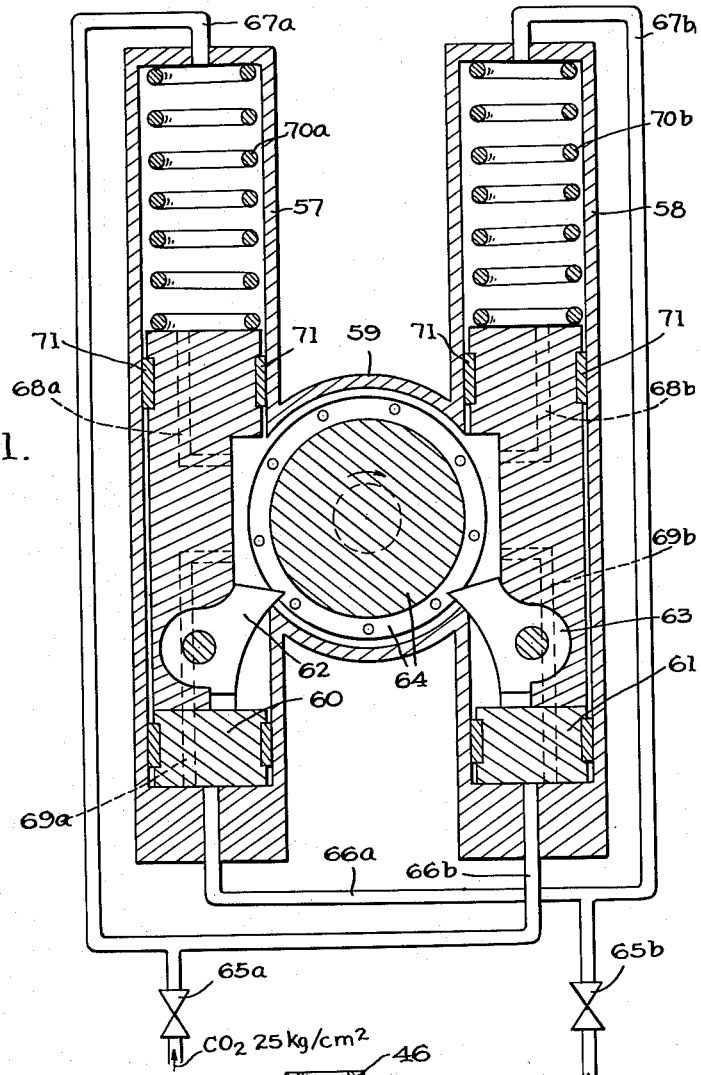
FIG. 11 shows a section on the plane perpendicular to the plane of FIG. 1 of a device for control by step-by-step rotation, operated pneumatically and which can be associated with one or other of the two selectors described previously.

The pneumatic control device for step-by-step rotation of the axle 3 for the above selectors is supplied with the $CO_2$, at the ambient temperature and under pressure, utilised as a cooling fluid in the associated nuclear reactor; the $CO_2$ circuit uses a compressor in which the pressure of the $CO_2$ is about 15–25 kg./cm.$^2$; the loss of charge upstream of the selector is of the order of 5 kg./cm.$^2$ and there is thus a differential pressure of 5 kg./cm.$^2$ between the outlet from the compressor and the sector for operating its control device. This is shown in FIG. 11; it is constituted by two horizontal cylinders 57 and 58 opened laterally in their central zone in such a manner as to form a mono-block assembly with a casing 59 containing transmission means such as the axle 3 which drives the plate 15 through the intermediary of a system permitting lost motion at each reversal of the sense of rotation (disc 42 and abutments 44 and 45 in FIGS. 1 and 2); the assembly of the cylinders 57, 58, the casing 59 and the casing 1 of the selector is entirely of welded construction; the pistons 60 and 61 which undergo displacement in the above-mentioned cylinders cause rotation through the intermediary of respective ratchet pawls 62 and 63, of a ratchet wheel 64 connected to the axle 3; the pawl 62 permits rotations in the negative sense (the direction of the arrow) and the pawl 63 permits rotations in the positive sense; "two-way" electric valves 65a and 65b supply $CO_2$ at 25 kg./cm.$^2$ and at the ambient temperature to the channels 66a and 66b, 67a and 67b supplying this gas at the faces of the pistons 60 and 61; calibrated conduits 68a, 68b, 69a and 69b are provided between the chambers delimited by the pistons 60 and 61 and the interior of the casing 59; in a plane perpendicular to that of these conduits, other calibrated conduits can communicate the inside of the casing 59 with the chamber situated above the plate 15 containing $CO_2$ at 20 kg./cm.$^2$.

Operation is effected in the following manner, when it is desired to effect a series of rotations of (−40°) of the ratchet wheel 64, commencing with opening of the two valves 65a and 65b, the pistons 60 and 61 then being in the position of rest shown in FIG. 11 (equal pressure at one side and the other of each piston); with $CO_2$ passing slowly through the conduits 68a, 68b, 69a and 69b towards the interior of the casing 59 (lower pressure), the electric valve 65a is then closed; the $CO_2$ continues to pass into the conduits, but the $CO_2$ contained in the chambers situated at the side of the spring 70a is not renewed; the pressure lowers in this chamber and the pistons 60 undergo slow and regular displacement in the direction of the arrow shown; at the rate and according to the quantity of the $CO_2$ which escapes through the conduit 68a, the piston 60 is displaced and compresses the spring 70a up to the end of the travel; the pressure in the chamber situated at the side of the spring 70a is then slightly higher than 20 kg./cm$^2$; the wheel 64a then rotates through (−40°); the piston 61 has not moved; the valve 65b is then closed; $CO_2$ at 25 kg. per cm.$^2$ contained in the chamber situated at the side opposite the spring 70a continues to pass slowly through the conduit 69a, but it is not replaced like that flowing through the conduit 68b; the pressure lowers more quickly in this chamber than in that containing the spring 70a, so that the spring decompresses and pushes the piston 60 into its initial position (return pressure due to the spring being compressed to the order of several kg. per cm.$^2$). If it is desired to effect rotation of (+40°), the electric valves 65a and 65b are opened, 65b is closed and then, after outward displacement of the piston 61 (the piston 60 being immobile), the electric valve 65a is closed in order to drive the piston 61 into its initial position; this control device does not include any lubricant; the two pistons 60 and 61 are provided with segments of carbon 51 permitting dry sliding; the assembly of the selector and of its control device does not permit any radioactive gas to escape to the exterior.

Figure 12:
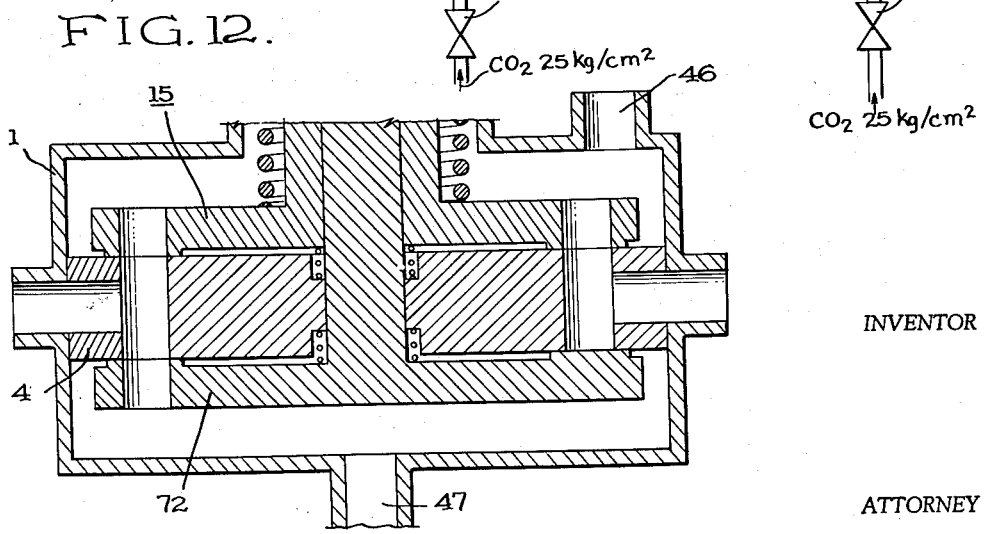
FIG. 12 shows an axial section through a third selector according to the invention comprising two rotary plates and two outlet passageways, the inlet passageways debouching laterally on the base member.
Figure 13:
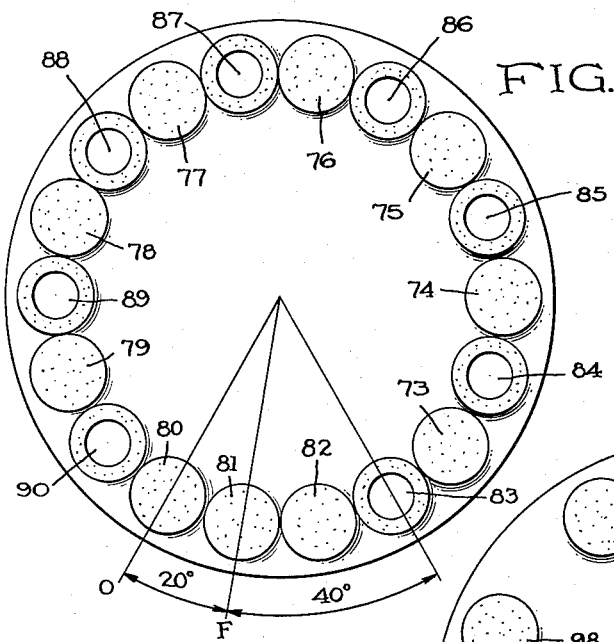
FIG. 13 shows a view from above of the upper plate.

Referring to FIG. 12, the casing 1 is shown, at the upper part of which are disposed the control devices for the rotation and displacement of the plates of the selector, which are described in FIGS. 16, 17 and 18. To this casing is fixed laterally the base member 4; the eight inlet passageways debouch laterally into this base and are subdivided in the interior thereof in order to emerge perpendicularly to its two plane faces; this selector comprises two outlet passageways, namely an "inspection passageway" 46 and a "follower passageway" 47. On the plane faces of the base member 4 are disposed two rotary plates 15 and 72 driven by the same axle, but being freely longitudinally movable in the direction of the axle; these plates as well as the base member 4 are of nitrided stainless steel; the upper plate 15 has ten carbon blockage members 73, 74, 75, 76, 77, 78, 79, 80, 81 and 82 and eight passageway orifices 83, 84, 85, 86, 87, 88, 89 and 90 disposed as shown in FIG. 13.

Figure 14:
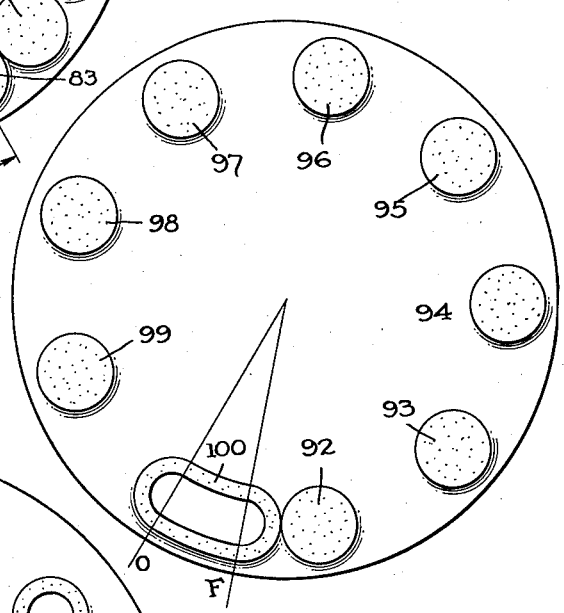
FIG. 14 shows a view from above of the lower plate.

The lower plate, shown in FIG. 14, has eight carbon blockage members 92, 93, 94, 95, 96, 97, 98 and 99, as well as an oblong orifice 100 corresponding to half the displacement of two consecutive orifices in the base member and situated in the vicinity of the blockage member 92.

Figure 15:
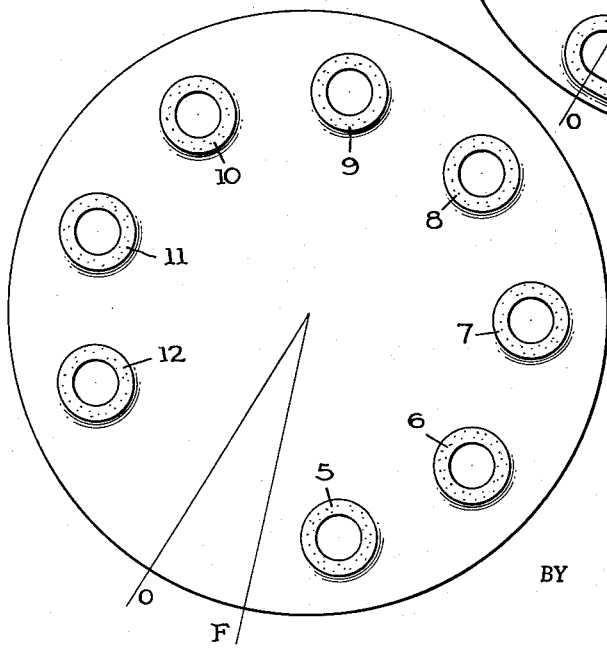
FIG. 15 shows a view from above of the base.

The base member 4 (FIG. 15) comprises eight orifices 5, 6, 7, 8, 9, 10, 11 and 12 corresponding to the eight lateral inlet passageways.

Operation is as follows:

Starting occurs from a "fully closed" position (blockage members 82 and 92 applied to one side and the other of the orifice 5).

Starting from this position, a rotation of (−20°) of the plates 15 and 72 is effected, by producting a rotation of (−40°) by means of a loss motion system; communication is thus obtained between the assembly of the eight inlet passageways and the "inspection passageway" 46.

A rotation of (+40°) starting from the "fully closed" position permits communication between an inlet passageway, and the "follower passageway," the oblong orifice 100 becoming located opposite this passageway, while the seven other inlet passageways are closed (eight positions possible defining the "follower" function, the ninth position corresponding to the "fully closed" position).

A reversal of the sense of rotation from one of the eight preceding positions, namely a rotation of (−20°), permits simultaneously to preserve communication between the same inlet passageway and the "follower passageway" by the clearance of the oblong orifice 100 and to establish communication between seven other inlet passageways and the "inspection passageway."

It may be noted that, by putting the blockage members on the base 4 and by freely mounting the plates 15 and 72, the diameter of the apparatus is considerably reduced.

The device for unstopping the plates 15 and 72 on the base 4 shown in FIG. 16 is operated before any rotation of the plates 15 and 72; after positioning, blockage by the spring 101 permits the sealing of the orifices to be ensured against the passage of the $CO_2$ at the level of the two plane faces of the base member 4; rotation of the plates is controlled by the sprocket 102 which engages the axle 103 connected to the plate 72; longitudinal movement is possible between the sprocket 102 and the axle 103; the plate 75 is rotationally connected to the axle 103 by means of a key and groove system 104; on exciting an electromagnet 105, the plate 15 effects a rotation of small amplitude through the intermediary of a control arm 106; a cam surface 107 acts on a pin 108 which has the effect of displacing the plates 15 and 72 with respect to one another and consequently of compressing the spring 101; the springs 108 and 109 undergo decompression; abutments (not shown) limit displacements of the plates 15 and 72; there is thus effected the rotation of both of the plates by the sprocket 102 and the electromagnet 108 is de-excited; under the action of the spring 101 which is partially decompressed, the plates 15 and 72 approach the base 4 by the required distance permitting sealed application of the blockage members on the holes in the base member.

FIGS. 17 and 18 show a permanent magnet 110 which is mounted on an axle 111 directly connected to the axle for controlling rotation of the plates of the selector; this magnet 110 can turn in a support member 112 carrying nine poles 113, 114, 115, 116, 117, 118, 119, 120 and 121 corresponding to the positions necessary for the plates. Each pole carries a winding which under the action of a current produces a field which, according to its polarity, repels or attracts the movable magnet 110 which becomes located in the maximum field.

As the distance between two positions is 40°, there is directly obtained the angle of rotation used for the selector in order to increase the rotation couple, and it is possible to excite three windings simultaneously or six altogether. For example according to FIG. 17, in order to turn in the negative sense, the winding 113 and 114 will be north in order to repel the magnet while the winding 115 will be south in order to attract it into the position desired. The windings 119 and 118 will be south to repel the magnet and the winding 120 will be north in order to attract it.

This control system is mounted on the selector of FIG. 12, since if it can produce rotations in the two senses, it can only transmit a slight force (of 0.5 metre per kg. for example, although the forces are to be applied for the selectors of FIGS. 1 and 5 of the order of 1.2 metres per kg.); the motor couple can also be increased by superposing two identical assemblies.

The most varied devices can be used for effecting step-by-step rotation of the selector according to the invention. In addition to those described, there can also be mentioned, by way of example, control by electromagnets and pneumatic control with a piston having a helicoidal groove in order to transform the alternating movement to which it is subjected into a discontinuous rotary movement.

What we claim is:

1. A rotary selector valve having an axis of rotation comprising a stationary valve casing, an internal chamber in said casing, a base member fixed to said casing, a plurality of first ports in said member spaced at a predetermined angular distance, two of said ports being spaced at a multiple of this distance about a circle centered on said axis, a plurality of fluid conduits each communicated with one of said first ports, plate means in said chamber spaced from said base member and rotatably mounted about said axis, a plurality of second ports in said plate means for registration with said first ports, a plurality of closure members carried by said plate means between said second ports for closing said first ports, a control device for step-by-step rotation of said plate means in either direction in steps equal to the angular distance between two adjacent closure members, and lost motion connecting means between said control device and said plate means having a predetermined angle of lost motion, the number of said closure members being greater by at least one than the number of said first ports and all but one of said closure members being angularly spaced from one of said second ports by an amount equal to said angle of lost motion.

2. A selector according to claim 1, in which said base member is provided with $n$ first ports corresponding to $n$ inlet passageways, the angular distance between two consecutive first ports being $$\frac{2\pi}{n+1}$$

radians, except for two first ports of which the spacing is double, and said rotary plate rotatable in either direction and comprising $(n+1)$ closure members mounted elastically and disposed between $(n+1)$ second ports, except for two particular members located immediately following two particular second ports, and so constructed and arranged as to rotate for each step through $$\frac{2\pi}{n+1}$$

radians with an angular lost motion of $$\frac{2\pi}{2(n+1)}$$

radians, said plate on reversal of direction first rotating through an angle of $$\frac{2\pi}{2(n+1)}$$

radians and thereafter through an angle of $$\frac{2\pi}{n+1}$$

radians for each further step in the same direction whereby there can be established either the "fully closed" position, or a "fully open" position, or "one passageway open" positions or "one passageway closed" positions, an open condition corresponding to communication between at least one inlet passageway and an outlet passageway.

3. A selector according to claim 1, which comprises $n$ parallel inlet passageways perpendicular to said base member surface slideably engaged by said closure members, an outlet passageway acting as an "inspection passageway" debouching into the space situated, with respect to the rotary plate, at the side opposite that occupied by the base member, an outlet passageway acting as a "follower passageway" disposed axially at the interior of the base member, communication between an inlet passageway and the "follower passageway" being realised through the intermediary of a radial channel provided in the plate or in a part connected to the latter, the channel debouching at the one of its ends permanently on the "follower passageway" and at its other end at the surface of sliding between the base and the plate through the intermediary of an elastically mounted ring.

4. A valve as described in claim 1, comprising $n$ of said fluid conduits entering said base member radially and opening through two surfaces of said base member, said surfaces being slidably engaged by said closure members at points located at $$\frac{2\pi}{n+1}$$

radians, an outlet inspection passageway, an outlet follower passageway and means for maintaining communication between one of said fluid conduits and said follower passageway when communication is established between any of the other of said fluid conduits and said inspection passageway.

5. A valve as described in claim 4, including means for separating said first and second plates axially to minimize frictional forces.

6. A rotary selector valve for controlling the passage of fluid between passageways, comprising a stationary valve casing, an internal chamber in said casing, a base member fixed to said casing, a plurality of first ports in said base member spaced at a predetermined angular distance, two of said ports being spaced at double said distance, inlet passageways each communicated with one of said first ports, a rotatable plate in said chamber spaced from said base member, a plurality of second ports in said plate communicating with said chamber for registration with said first ports, an inspection passageway opening into said chamber, all but two of said second ports being equally spaced at said predetermined angular distance, said two ports being spaced at double said distance, a plurality of closure members carried by said plate each midway between adjacent ones of said second ports and spaced at said angular distance, a follower passageway opening into said chamber and a channel in said plate communicating with said follower passageway and opening through one of said closure members whereby said follower passageway is successively connected to each of said inlet passageways.

References Cited in the file of this patent
UNITED STATES PATENTS

| | | |
|---|---|---|
| 2,125,513 | Martin | Aug. 2, 1938 |
| 2,209,135 | Parker | July 23, 1940 |
| 2,493,880 | Korfman | Jan. 10, 1950 |